(12) United States Patent
Asanaka

(10) Patent No.: US 8,396,078 B2
(45) Date of Patent: Mar. 12, 2013

(54) RATE MATCHING DEVICE AND METHOD THEREOF, DE-RATE MATCHING DEVICE AND METHOD THEREOF

(75) Inventor: Kazunori Asanaka, Yokohama (JP)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 436 days.

(21) Appl. No.: 12/664,033

(22) PCT Filed: Jun. 5, 2008

(86) PCT No.: PCT/EP2008/057015
§ 371 (c)(1),
(2), (4) Date: Jun. 6, 2010

(87) PCT Pub. No.: WO2008/151981
PCT Pub. Date: Dec. 18, 2008

(65) Prior Publication Data
US 2010/0238786 A1    Sep. 23, 2010

Related U.S. Application Data

(60) Provisional application No. 60/953,084, filed on Jul. 31, 2007.

(30) Foreign Application Priority Data

Jun. 13, 2007    (JP) ................................ 2007-156629

(51) Int. Cl.
*H04J 3/22*    (2006.01)
(52) U.S. Cl. ........................................ 370/468; 714/790
(58) Field of Classification Search ....... 370/229–230.1, 370/232, 464, 465, 468; 714/786, 790
See application file for complete search history.

(56) References Cited

U.S. PATENT DOCUMENTS

| 6,751,772 B1 * | 6/2004 | Kim et al. ..................... 714/786 |
| 7,076,726 B1 | 7/2006 | Yun et al. |
| 8,171,383 B2 * | 5/2012 | Landau et al. ................ 714/790 |
| 2001/0024451 A1 | 9/2001 | Le Strat et al. |
| 2006/0013161 A1 * | 1/2006 | Suzuki .......................... 370/328 |
| 2006/0013181 A1 * | 1/2006 | Stolpman et al. ............. 370/342 |
| 2007/0030917 A1 | 2/2007 | Farag |

FOREIGN PATENT DOCUMENTS

| DE | 101 43 497 A1 | 3/2003 |
| EP | 1 170 896 A2 | 1/2002 |
| JP | 2002-199048 A | 7/2002 |

OTHER PUBLICATIONS

PCT International Search Report, dated Nov. 27, 2008, in connection with International Application No. PCT/EP2008/057015.
PCT International Preliminary Report on Patentability, dated Sep. 24, 2009, in connection with International Application No. PCT/EP2008/057015.
3GPP Technical Specification TS 25.212 V6.10.0 Technical Specification Group Radio Access Network; Multiplexing and channel coding (FDD) Release 6, Dec. 2006.

* cited by examiner

*Primary Examiner* — Kerri Rose
(74) *Attorney, Agent, or Firm* — Potomac Patent Group PLLC

(57) ABSTRACT

A rate matching method and device wherein the number of times to output each bit included in input data is determined in parallel, and the data length of the input data is expanded or contracted, based on basic parameters for expanding or contracting the input data and the bit number (m) of each bit of the input data. A de-rate matching method and device is also disclosed wherein expanded or contracted data is decoded to pre-expanded/contracted data.

11 Claims, 17 Drawing Sheets

FIG. 1

```
if (EXECUTE PUNCTURE) {
  e = e_ini              --STARTING VALUE OF e
  m = 1                  --INDEX OF CURRENT BIT
  while (m ≤ X_i) {
    e = e - e_minus      --UPDATE e
    if (e ≤ 0) {         --CHECK WHETHER TO PUNCTURE mTH BIT
      PUNCTURE BIT x_{i, m}
      e = e + e_plus     --UPDATE e
    }
    m = m + 1            --TO NEXT BIT
  }
}
else {                   --EXECUTE REPETITION
  e = e_ini              --STARTING VALUE OF e
  m = 1                  --INDEX OF CURRENT BIT
  while (m ≤ X_i) {
    e = e - e_minus      --UPDATE e
    while (e ≤ 0) {      --CHECK WHETHER TO CARRY OUT REPETITION OF mTH BIT
      REPETITION OF BIT x_{i, m}
      e = e + e_plus     --UPDATE OF e
    }
    m = m + 1            --TO NEXT BIT
  }
}
```

FIG. 2

| m | e | m | e | m | e | m | e |
|---|---|---|---|---|---|---|---|
| 1 | -5 | 9 | 11 | 17 | -5 | 25 | 11 |
| 2 | 21 | 10 | 5 | 18 | 21 | 26 | 5 |
| 3 | 15 | 11 | -1 | 19 | 15 | 27 | -1 |
| 4 | 9 | 12 | 25 | 20 | 9 | 28 | 25 |
| 5 | 3 | 13 | 19 | 21 | 3 | 29 | 19 |
| 6 | -3 | 14 | 13 | 22 | -3 | 30 | 13 |
| 7 | 23 | 15 | 7 | 23 | 23 | 31 | 7 |
| 8 | 17 | 16 | 1 | 24 | 17 | 32 | 1 |

FIG. 6

$$q(m) = \left\lceil \frac{m \cdot e_{minus} - e_{init} + 1}{e_{plus}} \right\rceil$$

```
if (EXECUTE PUNCTURE) {
    m=1                                    --INDEX OF CURRENT BIT
    while (m≦Xi) {
        if (q(m−1)<q(m)) {                 --CHECK WHETHER TO PUNCTURE mTH BIT
            PUNCTURE BIT xi, m
        }
        m=m+1                              --TO NEXT BIT
    }
}
else {
    m=1                                    --EXECUTE REPETITION
                                           --INDEX OF CURRENT BIT
    while (m≦Xi) {
        REPETITION OF BIT xi, m (q(m)−q(m−1)) TIMES
        m=m+1                              --TO NEXT BIT
    }
}
```

FIG. 8

$$q(m) = \left\lceil \frac{m \cdot e_{minus} - e_{ini} + 1}{e_{plus}} \right\rceil$$

$$g(m) = \begin{cases} 1 - (q(m) - q(m-1)) & \text{(PUNCTURE MODE)} \\ q(m) - q(m-1) + 1 & \text{(REPETITION MODE)} \end{cases}$$

```
m=1                          --INDEX OF CURRENT BIT
while (m ≦ Xi) {
    OUTPUT BIT xi, m g(m) TIMES
    m=m+1                    --TO NEXT BIT
}
```

FIG. 13

$$q(m) = \left\lceil \frac{m \cdot e_{minus} - e_{ini} + 1}{e_{plus}} \right\rceil$$

$$g(m) = \begin{cases} 1 - (q(m) - q(m-1)) & \text{(PUNCTURE MODE)} \\ q(m) - q(m-1) + 1 & \text{(REPETITION MODE)} \end{cases}$$

$$a(m) = \begin{cases} m - q(m-1) & \text{(PUNCTURE MODE)} \\ m + q(m-1) & \text{(REPETITION MODE)} \end{cases}$$

```
m=1                                          --INDEX OF CURRENT BIT
while (m≦Xi) {
   STORAGE OF BIT xi,m IN MEMORY ADDRESS a(m)~a(m)+g(m)−1
   m=m+1                                     --TO NEXT BIT
}
```

F I G. 15
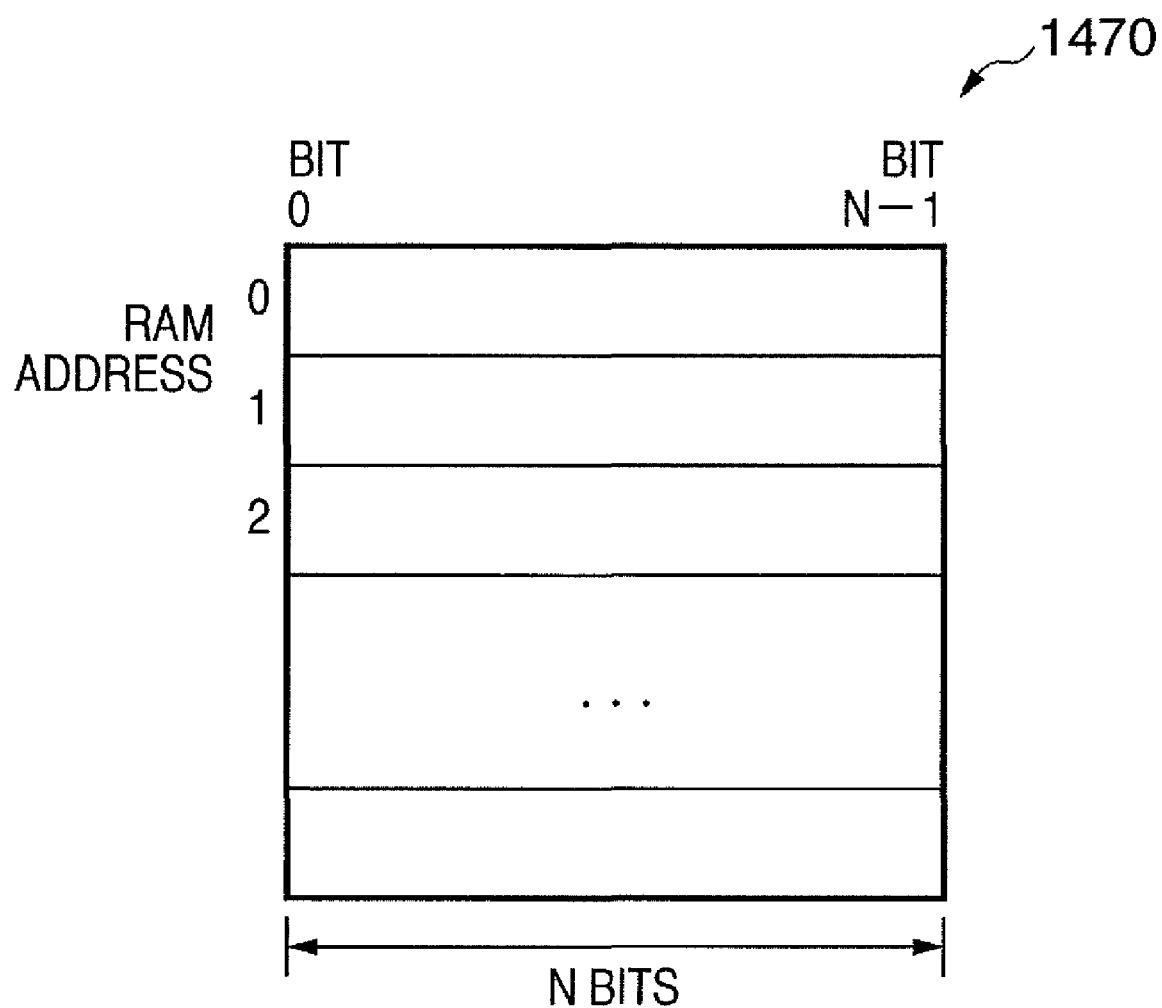

RATE MATCHING DEVICE AND METHOD THEREOF, DE-RATE MATCHING DEVICE AND METHOD THEREOF

CROSS-REFERENCE TO RELATED APPLICATIONS

This application claims priority under 35 U.S.C. §119 to Japanese Patent Application No. 2007-156629, filed Jun. 13, 2007, which is hereby incorporated herein by reference in its entirety. This application also claims the benefit of U.S. Provisional Application No. 60/953,084, filed Jul. 31, 2007, which is hereby incorporated herein by reference in its entirety

FIELD OF THE INVENTION

The present invention relates to a rate matching device and a method thereof, a de-rate matching device and a method thereof, a communication device, program, and recording medium, and, in particular, to technologies which accelerate rate matching processing/de-rate matching processing.

DESCRIPTION OF THE RELATED ART

In WCDMA (Wideband Code Division Multiple Access) communication systems, rate matching processing is executed on each bit after channel encoding, when encoding, transmitting and receiving data between communication devices. Rate matching is processing which expands or contracts the data length of input data by repeating (repetition) and puncturing (puncture) part of the bits of the input data. When transmitting encoded data in a WCDMA communication system, the transport channel is multiplexed to an identical physical channel, but in general, request conditions of communication quality differs for each transport channel. For this reason, in a WCDMA communication system, by carrying out fine adjustment of the strength of the error correction by performing rate matching, it is possible for all transport channels to achieve the target quality at the same time without excess or deficiency.

FIG. 1 shows an algorithm of rate matching processing of 3GPP Release 6 (Non-patent document 1). In FIG. 1, e is a parameter variable for determining, for each bit of data to be subject to rate matching processing, whether there is repetition or puncture. The parameter variable m shows the index of the current bit (bit subject to processing) of the data subject to processing.

$X_i$ is the data length of data subject to processing, and $X_{i,m}$ is the bit value of the current bit of data subject to processing. $e_{ini}$ is the initial value of parameter e, and $e_{minus}$ and $e_{plus}$ are update values of parameter e ($e_{minus}$ is the decrement value, $e_{plus}$ is the increment value). $e_{ini}$, $e_{minus}$ and $e_{plus}$ are computed based on data length $X_i$, etc., and details of the computation procedure are specified in the standard specification of 3GPP Release 6 (Non-patent document 1). In addition, $e_{ini}$ and $e_{plus}$ have the relationship $1 \leq e_{ini} \leq e_{plus}$.

As an example of rate matching processing, the case in which data having a data length of 32 bits ($X_i=32$) is punctured and made to be 26 bits will be described. Processing conditions are $e_{ini}=1$, $e_{minus}=6$ (number of bits to be punctured), $e_{plus}=32$ (number of bits of data before processing). In this case, for m=1~32, the values of e immediately after executing "$e=e-e_{minus}$" are shown in FIG. 2. As in FIG. 2, for m=1, 6, 11, 17, 22 and 27, $(e-e_{minus}) \leq 0$ (shaded area), so the $1^{st}$, $6^{th}$, $11^{th}$, $17^{th}$, $22^{nd}$, and $27^{th}$ bit, for a total of 6 bits, are punctured.

Rate matching processing is performed on all bits that have been encoded, but it is anticipated that the data transfer rate will dramatically increase in the future due to eHSPA (Evolved High Speed Packet Access) technology, LTE (Long Term Evolution) technology, and the like. However, as described above, because the parameter e of a bit is computed based on the parameter e of the bit immediately preceding it, when processing is carried out according to the algorithm of FIG. 1, it becomes necessary to sequentially compute each bit starting from the first bit, as it is not possible to attain a sufficient processing speed by simply increasing the processor clock cycle. Consequently, it is necessary for there to be a system of speeding up rate matching/de-rate matching processing.

As a technology to speed up rate matching, there is known a configuration in which data to be processed is divided into a plurality of blocks, the parameter e of each bit is computed in a parallel fashion for each block, and the bit for puncturing/repetition is determined (Patent document 1). According to this configuration, since parameter e is computed in a parallel fashion for each block, rate matching/de-rate matching processing can be accelerated.

[Non-patent document 1] Universal Mobile Telecommunications System (UMTS); Multiplexing and channel coding (FDD) (3GPP TS 25.212 version 6.10.0 Release 6)

[Patent document 1] Japanese Patent Laid-Open No. 2002-199048

SUMMARY OF THE INVENTION

However, even in the configuration disclosed in patent document 1, since there is a need, inside each block, to sequentially compute the parameter e based on the parameter e of the first bit, there is a limit to how fast processing based on this method can be performed.

The present invention was made in view of the above problems, and has as its object to provide a technology for executing rate matching/de-rate matching processing at an even faster speed.

In order to achieve the above object, the present invention in its first aspect provides a rate matching device as specified in some of the claims.

In addition, the present invention in its second aspect provides a de-rate matching device as specified in other ones of the claims.

In addition, the present invention in its third aspect provides a communication device comprising at least one of the rate matching device according to the first aspect, and the de-rate matching device according to the second aspect.

Further features of the present invention will become apparent from the following description of exemplary embodiments (with reference to the attached drawings).

BRIEF DESCRIPTION OF THE DRAWINGS

FIG. 1 is a diagram showing an algorithm of rate matching processing of 3GPP Release 6.

FIG. 2 is a diagram showing an example of execution of rate matching processing.

FIG. 6 is a diagram showing the procedure of rate matching processing 1.

FIG. 8 is a diagram showing the procedure of rate matching processing 2.

FIG. 13 is a diagram showing the procedure of rate matching processing 3.

FIG. 15 is a diagram schematically showing the configuration of RAM into which can be stored N bits of data per 1 address block.

DESCRIPTION OF THE EMBODIMENTS

Preferred embodiments of the present invention will now be described with reference to the attached drawings. However, the structural components described in these embodiments are merely examples, and are not meant to restrict the scope of the present invention. In addition, not all combinations of features described in the present embodiments are necessarily required in order to achieve the present invention.
<Arrangement of the Communication Device>

Figure 3:
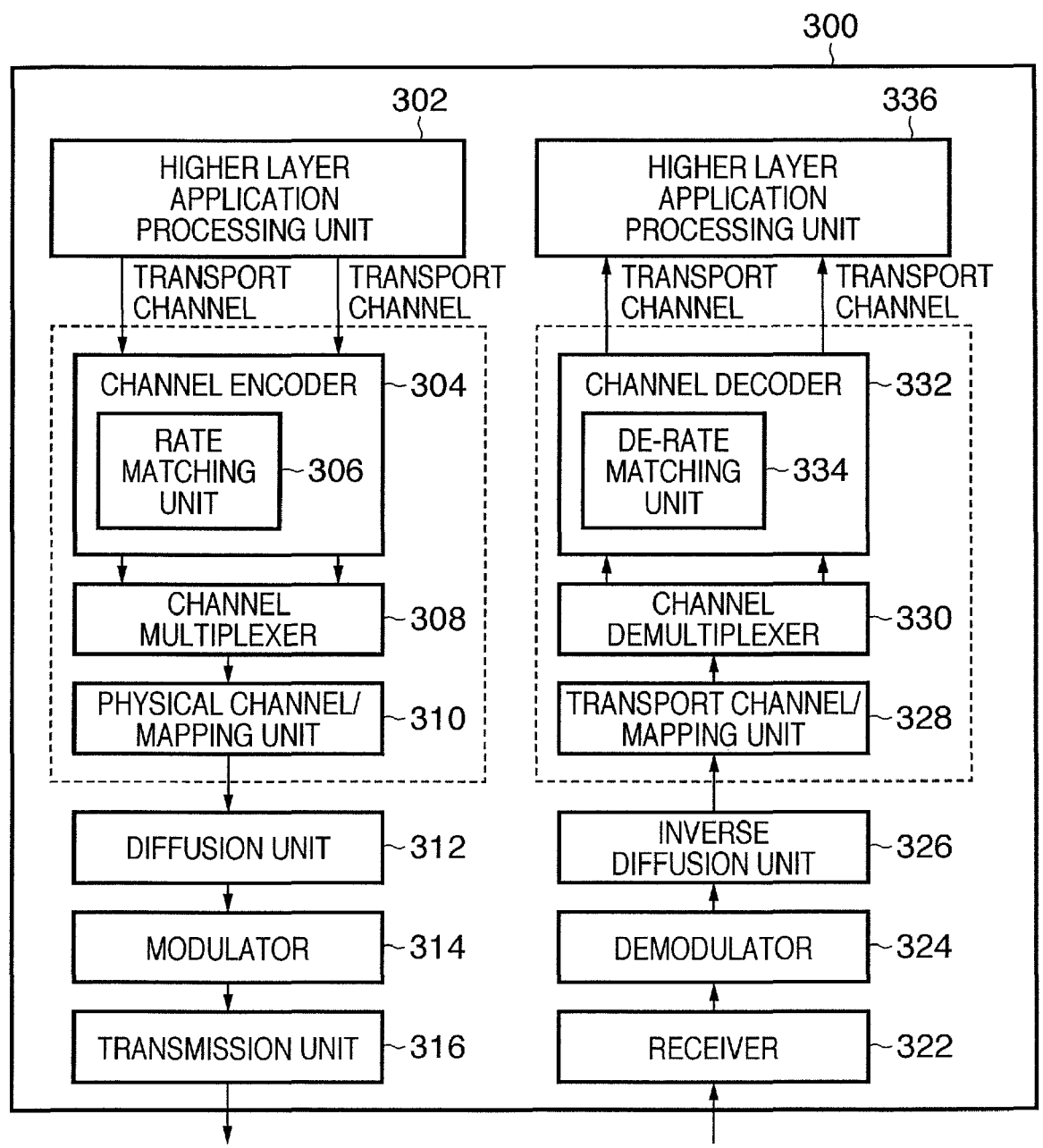
FIG. 3 is a block diagram showing an overview of a functional configuration of a communication device.

First, FIG. 3 will be referenced in describing the functional configuration of a communication device which executes rate matching/de-rate matching processing. FIG. 3 is a block diagram showing an overview of the functional configuration of a communication device 300. Also, the communication device 300 includes an antenna device, a mobile telephone unit which has the antenna device internally or externally, a mobile station such as a personal computer, and a base station.

As in FIG. 3, the communication device 300 has, as functional elements for transmitting data, a higher layer application processing unit 302, a channel encoding unit 304 including a rate matching unit 306, a channel multiplexer 308, a physical channel mapping unit 310, a diffusion unit 312, a modulator unit 314, and a transmission unit 316. In addition, the communication device 300 has, as functional elements for transmitting data, a receiver unit 322, a demodulator 324, an inverse diffusion unit 326, a transport channel mapping unit 328, a channel demultiplexer 330, and a channel decoding unit 332 including a de-rate matching unit 334, and a higher layer application processing unit 336.

When transmitting data, the transport block of each transport channel is input into the channel encoding unit 304 from the higher layer application processing unit 302. In a channel encoding unit 304, channel encoding processing is performed for each transport channel. Among processing executed by the channel encoding unit 304 are the following:

Addition of a CRC (Cyclic Redundancy Check) bit to a transport block.

Concatenation of transport blocks and division of encoding blocks.

Encoding by error correction (convolution code or turbo code).

Rate matching by a rate matching unit 306.

A first interleave for increasing error correction effect.

Dividing into data for each wireless frame.

Moreover, in the case of a downlink, that is, the communication device 300 transmitting data to a mobile station as a base station, processing involving inserting a first DTX display into a bit position which performs DTX (Discontinuous Transmission) is executed.

Transport blocks which have been channel encoded for each transport channel by the channel encoding unit 304 are joined for each wireless frame and multiplexed by the channel multiplexer 308. Then, in the physical channel mapping unit 310, the transport blocks are divided for each physical channel, and data of 1 frame is mapped to the slot of the individual data channel. In addition, in the physical channel mapping unit 310, a second interleave is executed in each wireless frame. Also, in the case of a downlink, a second DTX display is further inserted.

Data that has undergone physical channel mapping is diffused by the diffusion unit 312 by channelization encoding and scrambling encoding, modulated by the modulator 314, and transmitted from the transmitter 316 as radio signals.

On the other hand, in the case of receiving data, when radio signals are received by the receiver unit 322, the radio signals are demodulated by a demodulator 324. Then, inverse diffusion by scrambling encoding and channelization encoding is performed by the inverse diffusion unit 326, and the signals are input to the transport channel mapping unit 328.

In the transport channel mapping unit 328, a wireless frame is restored from an independent physical data channel slot, and de-interleaving is carried out to return the second interleave to its original state. In addition, a downlink, that is, a communication device 300 transmitting data to a mobile station as a base station, in the case of the communication device 300 receiving data from a base station as a mobile station, processing is carried out in which the second DTX display is deleted.

Next, the channel demultiplexer 330 divides the data into data for each transport channel, and the channel decoding unit 332 performs channel decoding processing for each transport channel. The processing below is included in the processing executed by the channel decoding unit 332.

Concatenation of data that has been subject to wireless frame division.

De-interleaving to return the first interleave to its original state.

De-rate matching by the de-rate matching unit 334 for returning data whose data length has been expanded or contracted to its original state.

Decoding by error correction code (convolution code and turbo code).

Extraction and checking of CRC bits.

In addition, a downlink, that is, the communication device 300 transmitting data to a mobile station as a base station, in the case of the communication device 300 receiving data from a base station as a mobile station processing is carried out in which the first DTX display is deleted.

Data which has undergone channel decoding by the channel decoding unit 332 is provided to the higher layer application processing unit 336.

<Configuration Example of the Rate Matching Circuit>

The rate matching device and de-rate matching device of the present embodiment is applied to the rate matching unit 306 and the de-rate matching unit 334 of FIG. 3. Here, in order to make the advantages of the rate matching device and the de-rate matching device according to the present embodiment even more clear, the circuit corresponding to the algorithm in FIG. 1 and its problems will be outlined before going into a detailed description of the configuration of the present embodiment.

Figure 4:
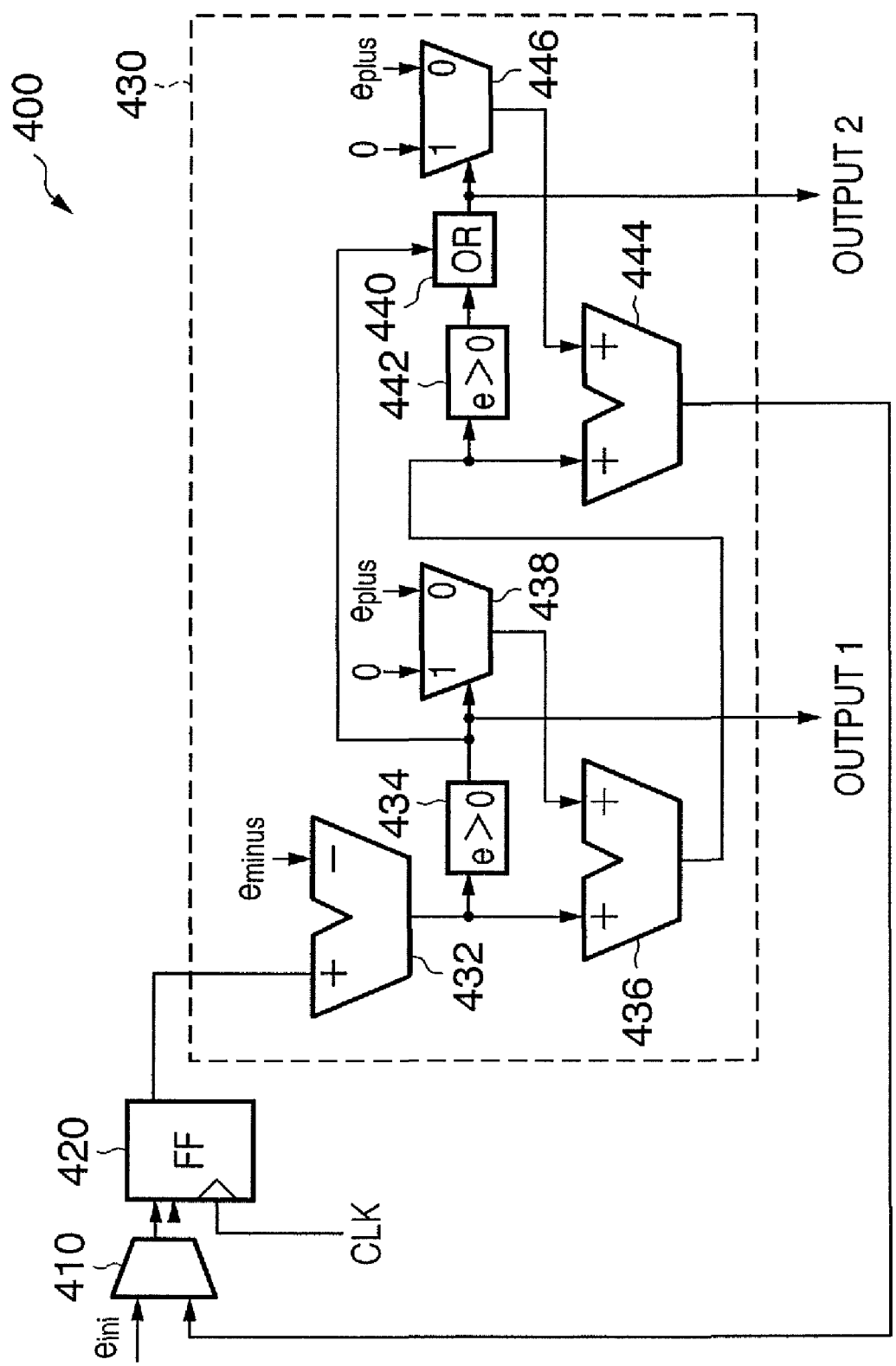
FIG. 4 is a diagram showing an example of a circuit which performs rate matching.

The electronic circuit executing the algorithm of FIG. 1 can be, for example, configured as shown in FIG. 4. FIG. 4 is a diagram showing an example of a circuit 400 which performs rate matching. As shown in FIG. 4, the circuit 400 has a multiplexer 410, a flip flop (FF) 420, and a computation unit 430 which determines puncture/repetition of one bit that is subject to processing.

The computation unit 430 in FIG. 4 corresponds to processing within a rate matching ratio in the range of 0~3. Here, the rate matching ratio is a value indicating the fraction of an output bit number of an input bit number. In other words, the computation unit 430 can execute puncturing and up to two repetitions on a subject bit (e.g., in the case of executing two repetitions on one bit that is the subject of processing, a total of 3 bits are output, so the rate matching ratio is 3.)

In puncture mode, the computation unit 430 outputs 0 from an output 1 when puncturing the subject bit, and when not puncturing, outputs 1 from the output (in puncture mode, the value of an output 2 is indeterminate.)

On the other hand, in repetition mode, when performing one repetition of the subject bit, the output is (output 1, output 2)=(0, 1). When performing two repetitions, the output is (output 1, output 2)=(0,0). When not performing repetition, the output is (output 1, output 2)=(1,1).

The circuit 400 outputs from the computation unit 430 the output 1 and the output 2 indicating puncture/repetition (in the case of repetition the number of repetitions) for one bit that is subject to processing each time a clock (CLK) is input to the FF 420. The parameter e of the bit immediately before the subject bit is recorded in the FF 420, and, when the clock in input, the FF 420 outputs that parameter e to an addition unit 432. The addition unit 432 calculates the difference value between the values of e input from the FF 420 and $e_{minus}$, and outputs the difference value to a determination unit 434 and an addition unit 436.

The determination unit 434 determines whether the difference value ($e-e_{minus}$) input from the addition unit 432 is positive or negative, and outputs externally, as the output 1, 1 if positive, 0 if less than or equal to 0. At the same time, the determination unit 434 outputs the same value to a multiplexer 438 and to an OR computation unit 440. The multiplexer 438 outputs to the addition unit 436 the value of 0 in the case where the value input from the determination unit 434 is 1, and the value of $e_{plus}$ is input in the case where the value input from the determination unit 434 is 0.

The addition unit 436 adds the difference value ($e-e_{minus}$) input from the addition unit 432 and the value input from the multiplexer 438, and outputs to the determination unit 442 and the addition unit 444. In this manner, the addition unit 436 performs processing of adding $e_{plus}$ in the case where ($e-e_{minus}$) is less than or equal to 0.

The processing of the determination unit 442, the addition unit 444, and the multiplexer 446 are the same as the processing of the determination unit 434, the addition unit 436, and the multiplexer 438. As shown in FIG. 4, these components are configured so that in the case where the value is 0 or less even if $e_{plus}$ is added to the parameter e by the addition unit 436, the addition unit 444 further adds $e_{plus}$. In the repetition mode, the addition of $e_{plus}$ by the addition unit 444 corresponds to repetition being performed twice.

In addition, the output of the addition unit 444 is input to the multiplexer 410. The multiplexer 410 outputs $e_{ini}$ to the FF 420 at the start of operations, and operates to output to the FF 420 the output from the addition unit 444.

In this manner, the processing in FIG. 2 is executed for one bit each time a clock is input into the FF 420. The output 1 and the output 2, which indicate whether or not there was puncturing and the number of repetitions, is then output from the computation unit 430.

In the above-mentioned configuration described with reference to FIG. 4, whether or not there was puncturing and the number of repetitions can only be determined for one bit of the input data for each clock. Moreover, the parameter e of any one bit is computed based on the parameter e of the bit immediately before, so processing must be sequentially advanced from the first bit of the input data. For this reason, in this configuration, the time required for rate matching/de-rate matching is proportional to the data length of the input data, so a sufficiently fast processing speed cannot be obtained.

Figure 5:
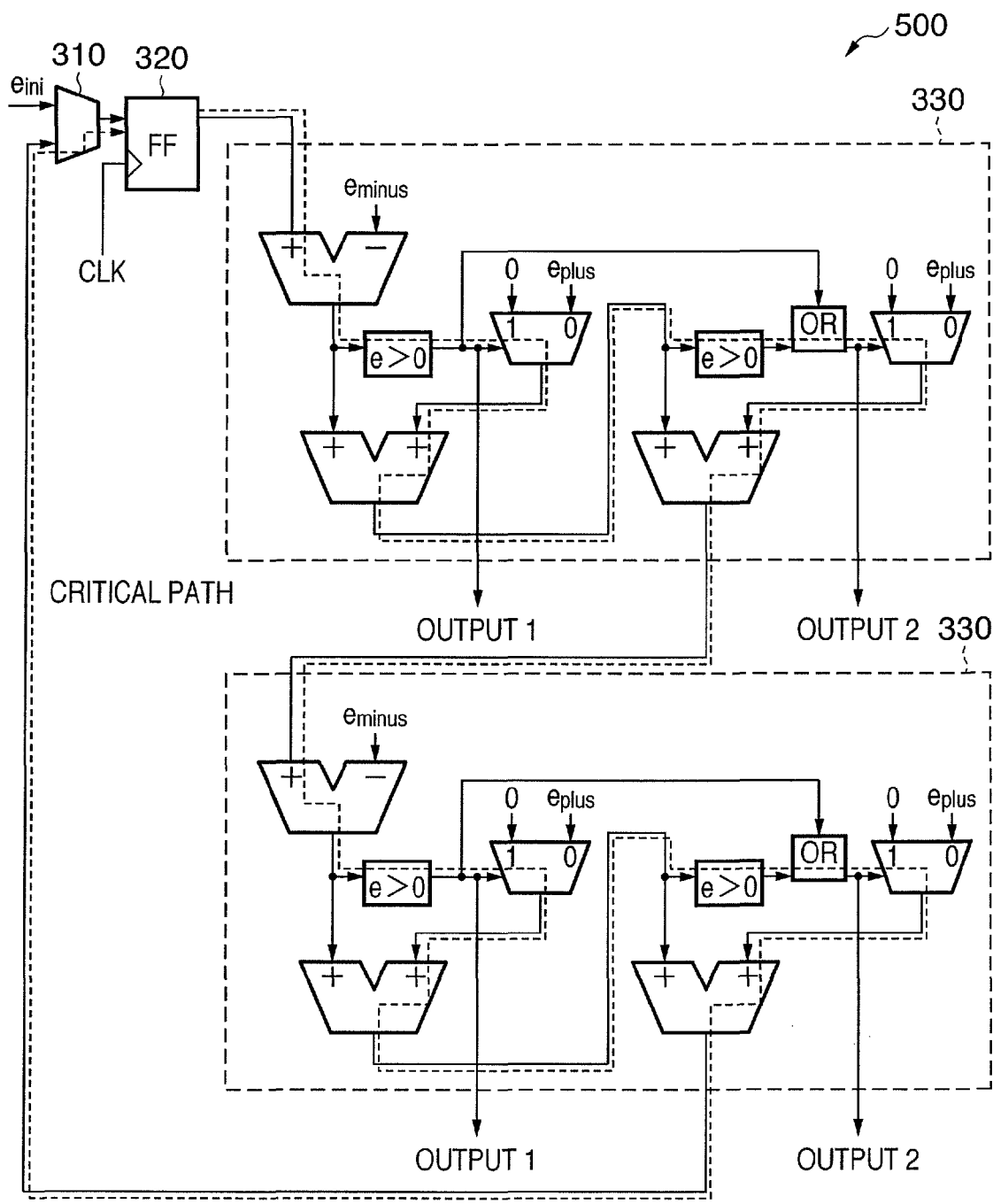
FIG. 5 is a diagram showing an example of the configuration of a circuit in which two computing units are connected.

Thus, for example, it is possible to, as shown in FIG. 5, connect a plurality of computation units 430 shown in FIG. 4, and to configure a circuit to determine puncturing/repetition of a plurality of bits in one clock. FIG. 5 is a diagram showing an example of the configuration of a circuit 500 in which two computation units 430 are connected. Because the processing of FIG. 2 is executed for two bits each time a clock is input in the FF 420, whether there was puncturing or the number of repetitions per one clock can be determined for every two bits.

However, when a plurality of computation units 330 are connected as shown in FIG. 5, the critical path becomes longer in proportion to the number connected, and there is a corresponding logic delay. This occurs because the parameter e of any one bit is computed based on the parameter e of the bit immediately before that bit. When the logic delay is large, the clock frequency is restricted to be low, and there is a limit to increasing processing speed using this approach.

Consequently, in the present embodiment, in the case where rate matching of input data is performed, by determining the output number of each of a plurality of bits included in this input data based only on the basic parameters initial value $e_{ini}$, decremental value $e_{minus}$, incremental value $e_{plus}$, and the order (bit number) of the subject bit in the input data, regardless of the results of processing of other bits, a configuration in which it is possible to perform high speed processing will be described below.

<Rate Matching Processing 1>

First, rate matching processing 1 will be described with reference to FIG. 6. FIG. 6 is a diagram showing the procedure of the rate matching processing 1. In considering the algorithm of FIG. 1, it is understood that both the process of puncturing or repetition of the subject bit and the process of adding the incremental value $e_{plus}$ to the parameter e are performed on the same condition. Accordingly, the number of puncturing or repetition of the subject bit is always equal to the number of adding the incremental value $e_{plus}$ to the parameter e. In the rate matching processing 1, this aspect is the subject of interest, and in order to make positive (an integer greater than or equal to 1) the value calculated by subtracting the decremental value $e_{minus}$ m times from the initial value $e_{ini}$ for the m-th bit of the input data, the minimum value q(m) for the number of the incremental value $e_{plus}$ to be added to the value is calculated, and determination of puncturing/repetition is performed on the m-th bit based on q(m)−q(m−1).

As in FIG. 6, in the puncturing mode of the rate matching processing 1, if q(m−1)<q(m) is established for each integer m satisfying 1≦m≦X$_i$ (X$_i$: input data length), the m-th bit X$_{i,m}$ of the input data is punctured. This is because the incremental value e$_{plus}$ is added between the parameter e corresponding to the (m−1)th bit and the parameter e corresponding to the m-th bit. However, $$q(m) = \left\lceil \frac{m \cdot e_{minus} - e_{ini} + 1}{e_{plus}} \right\rceil. \quad \langle\text{Formula 1}\rangle$$

Here, e$_{ini}$, e$_{minus}$, and e$_{plus}$ are parameters explained in the description of the related art.

On the other hand, in the repetition mode, for each integer m satisfying 1≦m≦X$_i$, the m-th bit x$_{i,m}$ of the input data is repeated (q(m)−q(m−1)) times. This is because, if the incremental value e$_{plus}$ is added between the parameter e corresponding to the (m−1)th bit and the parameter e corresponding to the m-th bit, repetition is performed for the number of times added.

Figure 7:
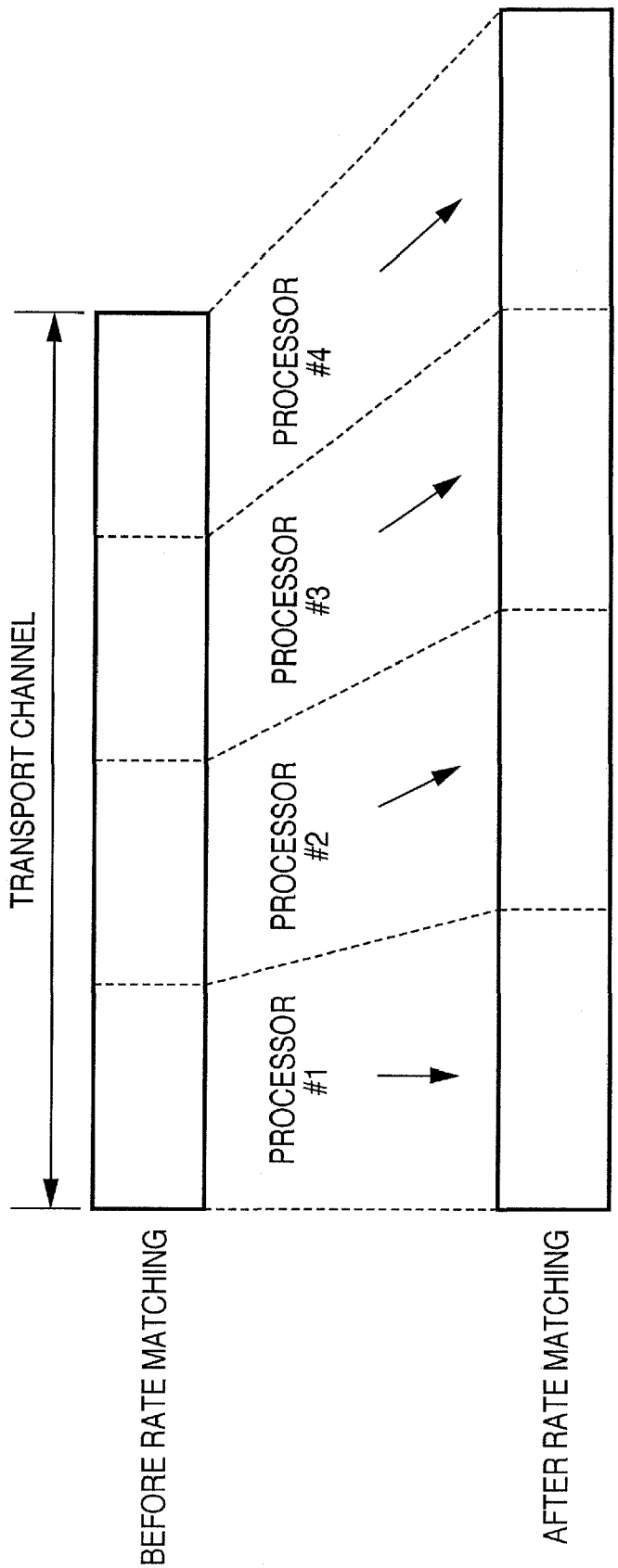
FIG. 7 is a diagram showing the manner in which rate matching processing is performed in a parallel fashion using a plurality of processors.

As shown above, in the rate matching processing 1, processing to determine whether or not there was puncturing of the m-th bit x$_{i,m}$ of the input data, and the number of repetition times, do not depend on the processing results of a different bit x$_{i,k}$ (k≠m). For this reason, according to the rate matching processing 1, it is possible to execute in a parallel manner the processing of each bit of the input data using different processors, as in FIG. 7.

Formula 1 will be described in more detail with reference to FIG. 17. As in FIG. 1, in the rate matching algorithm, the processing e=e−e$_{minus}$ is performed for each bit in the case of each puncture mode and repetition mode. Consequently, the decremental value e$_{minus}$ is subtracted m times (1702) from the parameter e after the initial value e$_{ini}$ is substituted (1701) until processing of the m-th bit of the input data is finished. On the other hand, as shown in FIG. 1, in the rate matching algorithm, in the case where the value of the parameter e becomes less than or equal to 0 as a result of subtracting the decremental value e$_{minus}$ from the parameter e, the incremental value e$_{plus}$ is added to the parameter e until a positive value (greater than or equal to 1) is achieved. Consequently, the incremental value e$_{plus}$ is added q(m) times until processing of the m-th bit is finished, and the value of the parameter e after finishing processing of the m-th bit becomes positive (an integer greater than or equal to 1) (1703).

Figure 17:
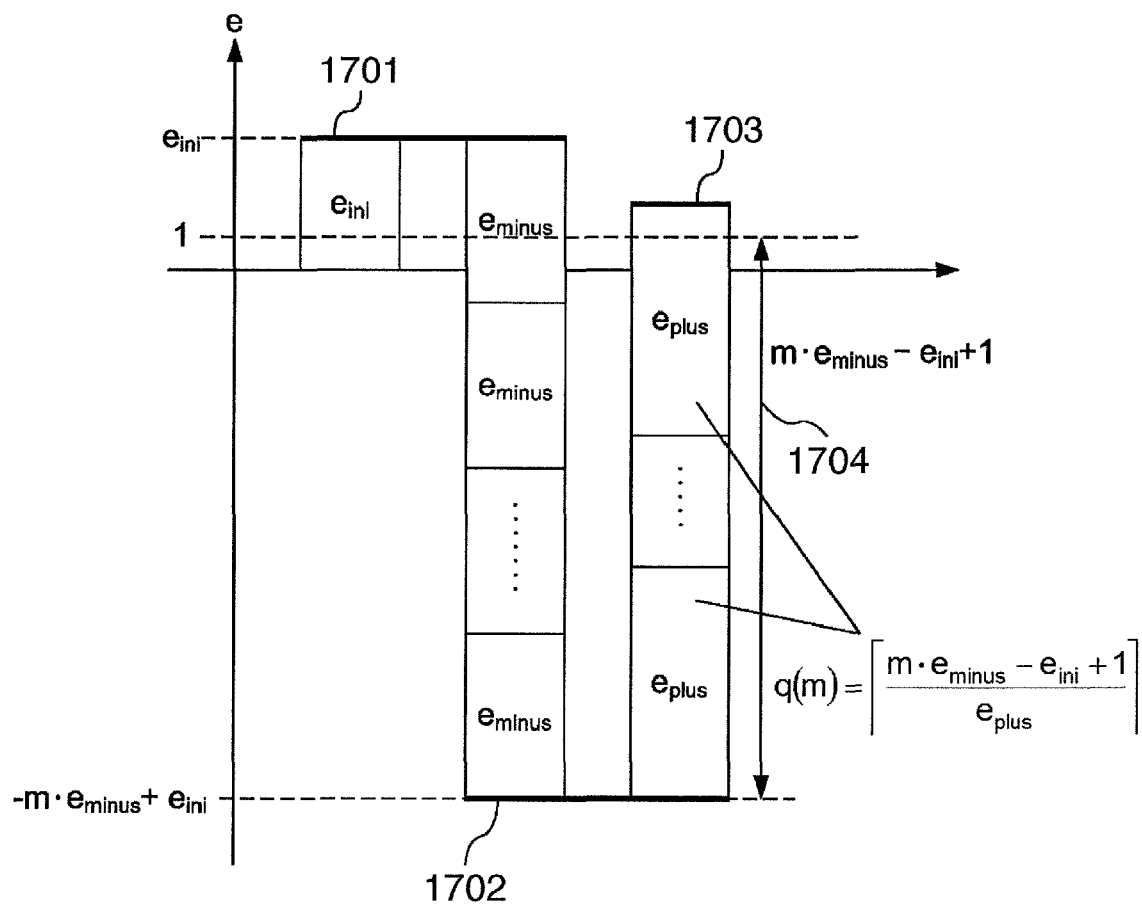
FIG. 17 is a diagram showing the relationship between a parameter e and a number of times added q(m) of an incremental value $e_{plus}$.

As shown in FIG. 17, in order for the parameter e after finishing processing of the m-th bit to become positive (greater than or equal to 1), it is required for the addition value resulting from adding the incremental value e$_{plus}$ q(m) times to be greater than or equal to 1−(−m*e$_{minus}$+e$_{ini}$)=m*e$_{minus}$−e$_{ini}$+1. Therefore, the number of times of addition q(m) fulfilling this condition is equal to the value (Formula 1) obtained from dividing m*e$_{minus}$−e$_{ini}$+1 by and rounding out the obtained value (if m*e$_{minus}$−e$_{ini}$+1 is negative, q(m)=0 is output by 1≦e$_{ini}$≦e$_{plus}$.)

Further, since 1≦e$_{ini}$≦e$_{plus}$, q(m) can be transformed as follows.

$$q(m) = \left\lceil \frac{m \cdot e_{minus} - e_{ini} + 1}{e_{plus}} \right\rceil = -\left\lfloor \frac{e_{ini} - m \cdot e_{minus} - 1}{e_{plus}} \right\rfloor \quad \text{[Formula 2]}$$
$$= \left\lfloor \frac{m \cdot e_{minus} - e_{ini}}{e_{plus}} \right\rfloor + 1 = -\left\lceil \frac{e_{ini} - m \cdot e_{minus}}{e_{plus}} \right\rceil + 1$$

<Rate Matching Processing 2>

In the puncturing mode of the rate matching processing 1, when q(m−1)<q(m) is established, the bit x$_{i,m}$ is punctured. Here, in the puncturing mode, e$_{plus}$ cannot be added to the same bit more than once, so q(m)−q(m−1)∈{0,1}. Therefore, performing rate matching of input data based on puncturing mode is equivalent to outputting bit x$_{i,m}$, including the original bit, 1−(q(m)−q(m−1)) times.

In addition, in the repetition mode of the rate matching processing 1, repetition of the bit xi, m is performed q(m)−q(m−1) times, but this is equivalent to outputting bit x$_{i,m}$, including the original bit, q(m)−q(m−1)+1 times.

As described above, the rate matching processing 1 (FIG. 6) uses $$g(m) = \begin{cases} 1 - (q(m) - q(m-1)) & \text{(puncture mode)} \\ q(m) - q(m-1) + 1 & \text{(repitition mode)} \end{cases} \quad \text{[Formula 3]}$$

and is equivalent to the rate matching processing 2 shown in FIG. 8. FIG. 8 is a diagram showing the procedure of the rate matching processing 2.

Figure 9:
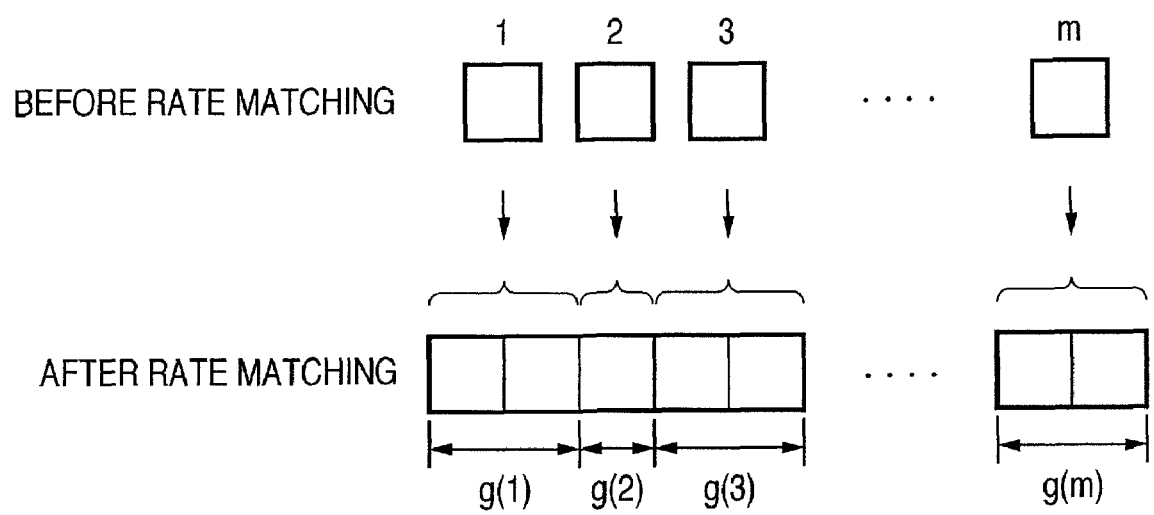
FIG. 9 is a diagram showing the schematic relationship between the bits of input data and bits of processed data.

In the rate matching processing 2, in both puncture mode and repetition mode, for each integer m which satisfies the relationship 1≦m≦X$_i$ (x$_i$: input data length), the m-th bit x$_{i,m}$ of the input data is output g(m) times. Therefore, according to the rate matching processing 2, when the relationship between the bits of the input data and the bits of the processed data is schematically shown, the result is FIG. 9.

As described above, in the rate matching processing 2, the number of output bits corresponding to the m-th bit xi,m of the input data does not depend on the processing result of other bits x$_{i,k}$ (k≠m). Consequently, according to the rate matching processing 2, it is possible to execute, in parallel, processing for each bit of input data using different processors.

Figure 10:
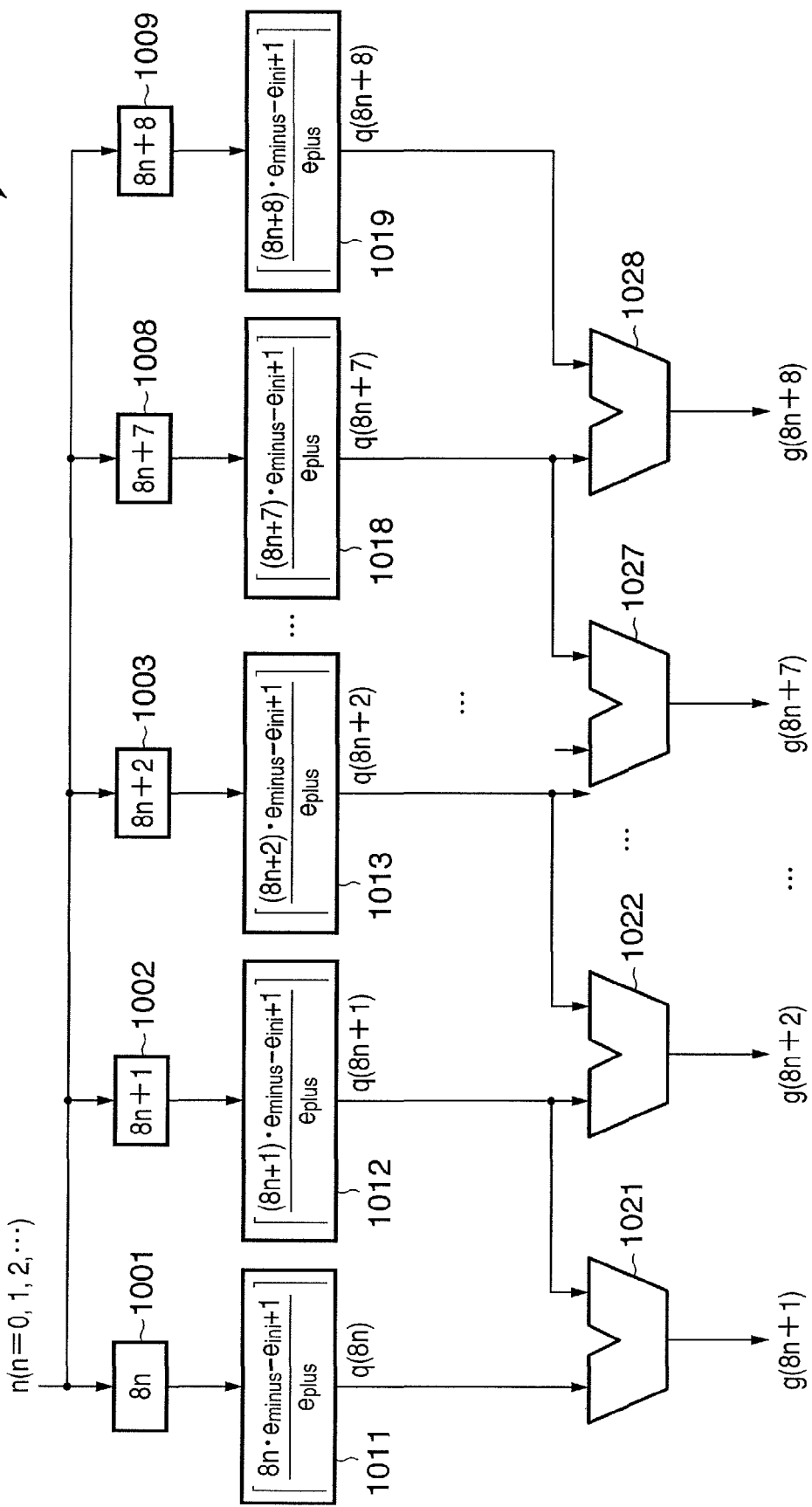
FIG. 10 is a diagram showing an example of the configuration of a circuit which calculates the number of times output g(m).

The circuit for calculating the above-described output number of times g(m) can be executed, for example, according to the circuit configuration shown in FIG. 10. FIG. 10 is a diagram showing one example of the configuration of a circuit 1000 which calculates the output number of times g(m). FIG. 10 shows an example of a circuit in which computation of the output number of times g(m) is performed in a sequential and parallel manner for 8 consecutive bits.

As in FIG. 10, the circuit 1000 has computation units 1001~1009 and 1011~1019, as well as addition units 1021~1028. The computation units 1001~1009 calculates, for n=0, 1, 2, . . . , 8n (1001), 8n+1 (1002), 8n+2 (1003), . . . , 8n+8 (1009), respectively, and outputs to the computation units 1011~1019. The computation units 1001~1009 assigns, to each of the computation units 1011~1019, the bit number of each bit of the input data to be processed.

Respective computation units 1011-1019 input each of m=8n, 8n+1, 8n+2, . . . , 8n+8 calculated in the computation units 1001-1009, and calculate $$q(m) = \left\lceil \frac{m \cdot e_{minus} - e_{ini} + 1}{e_{plus}} \right\rceil.$$

Then, the computation unit 1011 outputs q(8n) to the addition unit 1021. Respective computation unit 1012-1018 output each calculation result to the addition units 1021 and 1022, . . . , as well as addition units 1027 and 1028. The computation unit 1009 outputs q(8n+8) to the addition unit 1028.

The addition units 1021-1028 each calculate, based on inputs from the computation units 1011-1019, g(8n+1), g(8n+2), . . . , g(8n+8). Specifically, in the case of operating in puncture mode, the calculation g(m)=1−(q(m)−q(m−1)) is performed for m=8n+1, 8n+2, . . . , 8n+8, and in the case of operating in repetition mode, the calculation g(m)=q(m)−q(m−1)+1 is performed.

As described above, the circuit 1000 has a plurality of determination means which each determines the output number of times g(m) of outputting the m-th bit of an input data for each different bit of the input data, based on the basic parameters for performing expansion or contraction of the input data, which are the initial value $e_{ini}$, decremental value $e_{minus}$, and incremental value $e_{plus}$, as well as on the value of m. Therefore, according to this configuration, it is possible to determine, in a parallel manner, the number of output times of a plurality of bits without dependence on the processing of other bits.

In addition, in the example of FIG. 10, for example, the determination means for determining g(8n+1) is implemented by the computation units 1011 and 1012, and the addition unit 1021. The determination means for determining g(8n+2) is implemented by the computation units 1012 and 1013, and the addition unit 1022. In this manner, in the example of FIG. 10, the computation units for determining q(m) of adjacent determination means are shared. However, there are no problems in setting computation units for determining q(m) independently for each determination means. For example, it is possible to set a computation unit for calculating q(8n+1) which is input in the addition unit 1021, independently from a computation unit for calculating q(8n+1), which is input in the addition unit 1022.

In addition, in the example of FIG. 10, as an example configuration, it was indicated that the output number of times g(m) was determined 8 bits at a time, the number of bits to be determined at a time as an output number of times is not limited to 8, and can be any arbitrary value.

<Bit Address Generation Unit>

Figure 11:
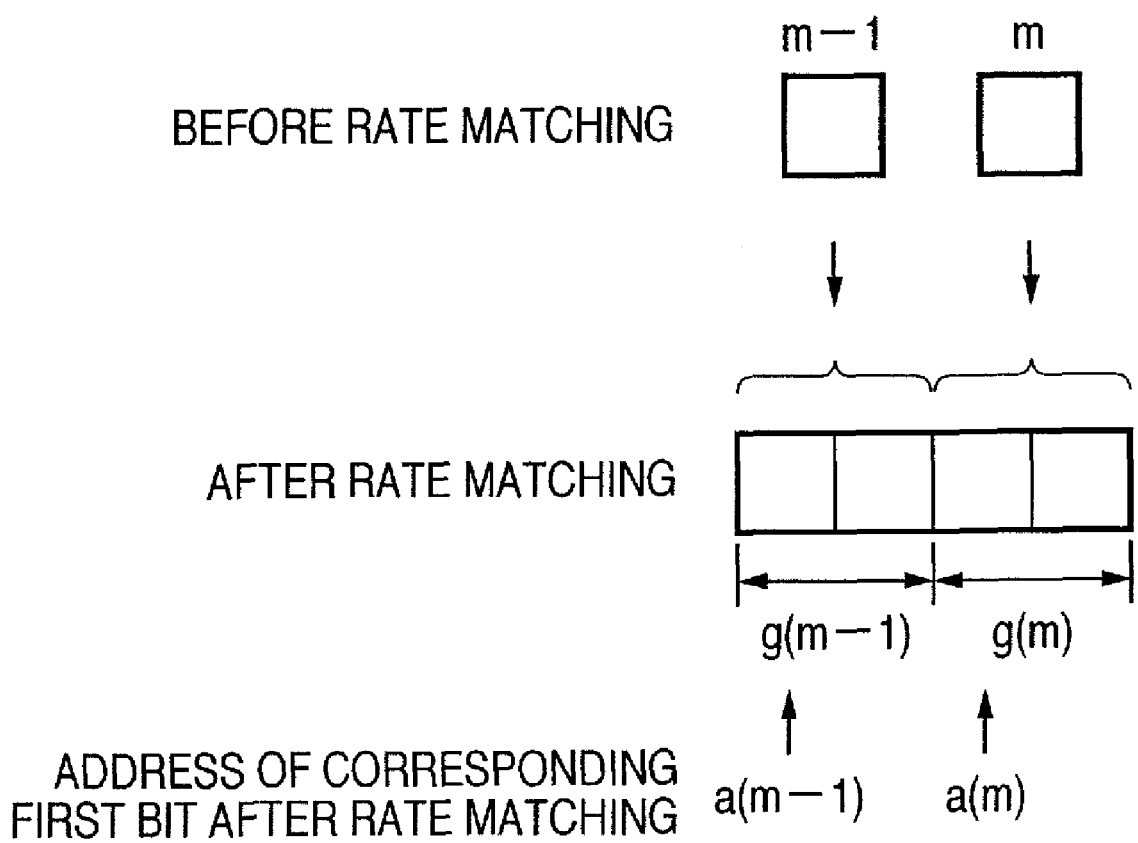
FIG. 11 is a diagram showing the first bit address a(m) of a bit set after rate matching of the m-th bit of the input data.

When referring to the value of the desired g(x)∈ (x{1, 2, . . . , $x_i$}) from {g(1), g(2), . . . , g($x_i$)}, it is convenient for the purposes circuit design if, as shown in FIG. 11, after rate matching of the m-th bit of input data, the value a(m) of the first bit address (first bit position) of the bit group (the number of which is g(m)) is known. Hence, processing will be described in which, for each integer m satisfying the relationship 1≦m≦$X_i$ (Xi: input data length), the address a(m) of the first bit is calculated and a(m) is output in addition to g(m). In addition, the first bit address a(m) is a value starting from 1 (a(m)≧1).

First, the calculating formula for determining the bit address a(m) is derived. As shown in FIG. 11, a(m)=a(m−1)+g(m−1) is derived. Therefore, the formula $$a(m) = a(1) + \sum_{n=1}^{m-1} g(n)$$

holds. Since g(m) is provided as in <Formula 3>, when a(1)=1, the a(m) in puncturing mode is provided by <Formula 4> below.

$$a(m) = a(1) + \sum_{n=1}^{m-1} g(n) \qquad \langle \text{Formula 4} \rangle$$

$$= a(1) + \sum_{n=1}^{m-1} \{1 - (q(n) - q(n-1))\}$$

$$= a(1) + (m-1) - q(m-1) + q(0)$$

$$= m - q(m-1)$$

In addition, from <Formula 1>, $$q(0) = \left\lceil \frac{-e_{ini} + 1}{e_{plus}} \right\rceil,$$

but, as explained in the Description of Related Art, q(0)=0 because 1≦$e_{ini}$≦$e_{plus}$.

On the other hand, the a(m) in repetition mode is provided by <Formula 5> below.

$$a(m) = a(1) + \sum_{n=1}^{m-1} g(n) \qquad \langle \text{Formula 5} \rangle$$

$$= a(1) + \sum_{n=1}^{m-1} \{(q(n) - q(n-1) + 1)\}$$

$$= a(1) + (m-1) + q(m-1) - q(0)$$

$$= m + q(m-1)$$

Figure 12:
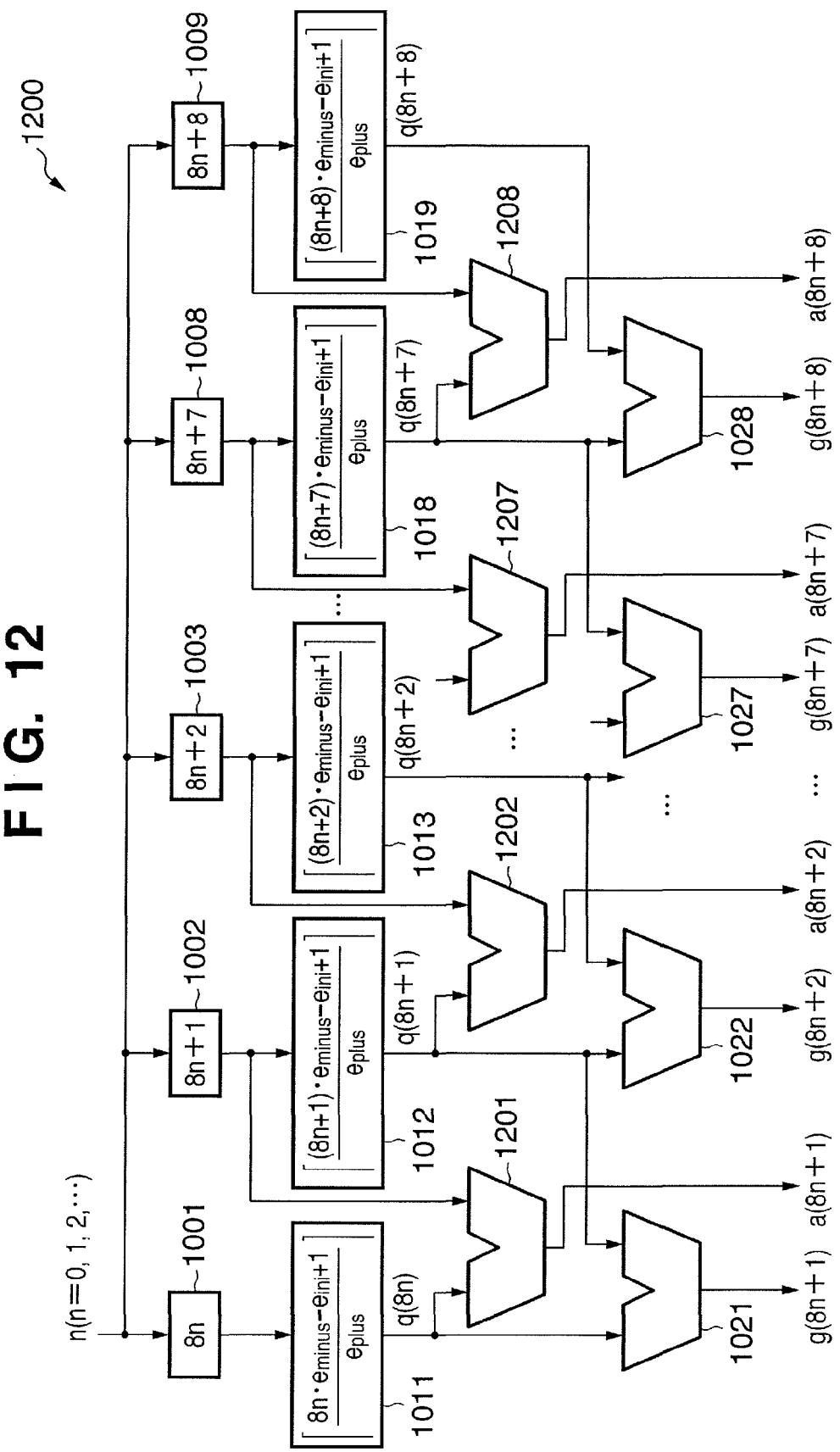
FIG. 12 is a diagram showing an example of the configuration of a bit address generation unit.

The rate matching processing 3, for example, can be executed by the circuit configuration shown in FIG. 12. FIG. 12 is a diagram showing an example of the configuration of a circuit (below, bit address generation unit) 1200 executing the rate matching processing 3. FIG. 12 shows an example of a circuit which computes g(m) sequentially, in a parallel manner, for 8 consecutive bits. In addition, for components that are the same as FIG. 10, the same reference numerals will be attached, and their descriptions will be omitted.

As shown in FIG. 12, the bit address generation unit 1200 has addition units 1201-1208 in addition to the components of the configuration of the circuit 1000 of FIG. 10. In addition, the computation units 1002-1009 output the calculation results (8n+1, . . . , 8n+8) to the addition units 1201-1208 respectively, and, at the same time, the computation units 1011-1019 outputs the calculation results (q(8n), . . . , q(8n+8)) to the addition units 1201-1208 respectively. The addition units 1201-1208, based on the input from the computation units 1002-1009 and the input from the computation units 1011-1018, calculates a(8n+1), a(8n+2), . . . , a(8n+8). Specifically, in the case of operating in puncture mode for m=8n+1, 8n+2, . . . , 8n+8, a(m)=m−q(m−1) is calculated, and, in the case of operating in repetition mode, a(m)=m+q(m−1) is calculated.

As described above, the bit address generation unit 1200 determines the first bit address a(m) of the position occupied in the expanded or contracted data (data that has already undergone rate matching) by the output result after rate matching of the m-th bit of the input data, based on the basic parameters (initial value $e_{ini}$, decremental value $e_{minus}$, and incremental value $e_{plus}$) and the value of m. In this manner, the processing result of other bits are not used when determining a(m), so it is possible to use the bit address generation unit

1200 in order to perform rate matching/de-rate matching processing from a desired bit position of the input data. In addition, in the case of executing rate matching/de-rate matching processing in a distributed manner using a plurality of processors or hardware, it is possible to easily find, using the bit address generation unit 1200, the address to which the processing result is to be written.

In addition, as is clear from FIG. 11, performing rate matching processing of input data and storing data after rate matching in a memory whose address starts from 1, is equivalent to storing an m-th bit of the input data in the memory addresses a(m) through {a(m)+g(m)−1}. FIG. 13 shows a procedure of this kind of rate matching processing (rate matching processing 3).

<Rate Matching Device>

Next, an example of the configuration of a rate matching device using the above-described bit address generation unit 1200 will be described.

Figure 14:
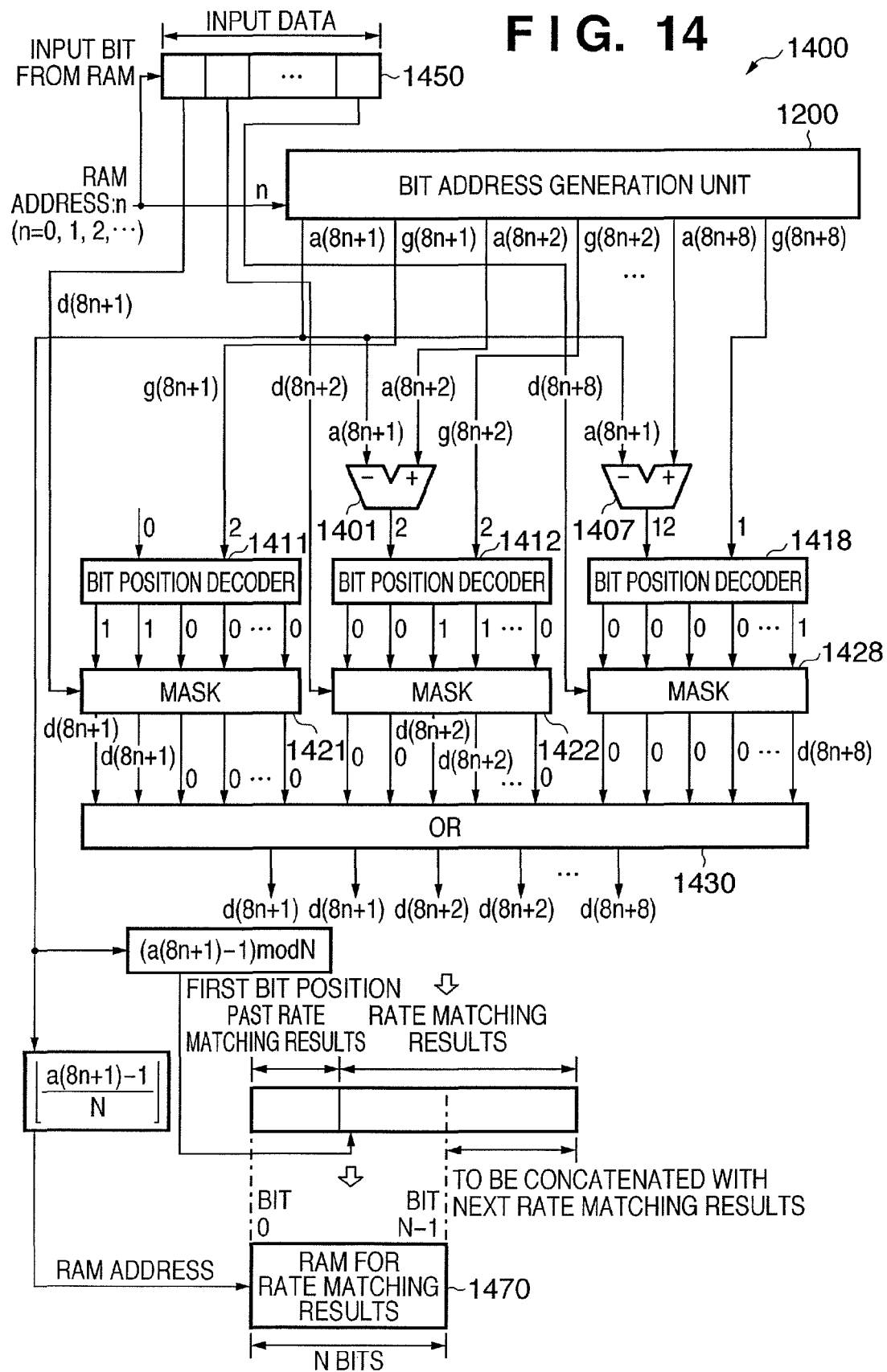
FIG. 14 is a diagram showing an example of a rate matching device using the bit address generation unit.

FIG. 14 is a diagram showing an example of a rate matching device 1400 using the bit address generation unit 1200. The rate matching device 1400 performs rate matching of input data 8 bits at a time in a parallel manner. As shown in FIG. 14, the rate matching device 1400 has the bit address generation unit 1200, 7 addition units 1401~1407, 8 bit position decoders 1411~1418, masters 1421~1428, and an OR computation unit 1430.

The bit address generation unit 1200 inputs n=0, 1, 2 ... from the counter (not diagrammatically shown), and determines first bit addresses a(8n+1), ..., a(8n+8) of the positions occupied by the expanded or contracted data of the (8n+1)~(8n+8)th bit of the input data, as well as the output number of times g(8n+1), ..., g(8n+8). The rate matching device 1400 performing processing to output the (8n+1)~(8n+8)th bit value d(8n+1), ..., d(8n+8) of the input data based on these first bit addresses and output number of times, to bit addresses a(8n+1)~{a(8n+1)+g(8n+1)−1}, ..., a(8n+8)~{a(8n+8)+g(8n+8)−1}, ..., a(8n+8)~{a(8n+8)+g(8n+8)−1}, respectively.

The bit address a(8n+1) determined by the bit address generation unit 1200 is output to the addition units 1401~1407, and the bit addresses a(8n+2)~a(8n+8) are output to the addition units 1401~1407 respectively. In addition, the output number of times g(8n+1)~g(8n+8) are output to the bit position decoders 1411~1418, respectively.

The addition units 1401~1407 subtract a(8n+1) from each of addresses a(8n+2), ..., a(8n+8), and outputs the subtracted result as an offset value to the bit position decoders 1412~1418.

The bit position decoders 1411~1418 outputs a bit 1 to, respectively, the bit position occupied by the (8n+1)~(8n+8)th bit of the input data in the expanded or contracted data, and a bit 0 to bit positions other than these bit positions. Specifically, they output bit 0 equal to the number of the offset values input from the addition units 1401~1407, and outputs a bit 1 equal to the number of times output of a bit input from the address generation unit 1200. Then, a bit 0 is output to the remaining bit positions. However, 0 is input to the bit position decoder 1411 as a certain offset value. The outputs of each of the bit position decoders 1411~ are input to corresponding masks 1421~1428.

For example, in FIG. 14, an example of the case in which g(8n+1)=2, g(8n+2)=2, g(8n+8)=1, a(8n+2)=3, and a(8n+8)=13 is given. IN this case, the offset value input to the bit position decoder 1411 is 0 and the bit output number of times is 2(=g(8n+1)), so the bit position decoder 1411 outputs 2 of bit 1 in a row, and outputs bit 0 to the remaining bit positions. Because the offset value input to the bit position decoder 1412 is 2(=a(8n+2)−a(8n+1)), and the bit output number of times is 2(=g(8n+2)), the bit position decoder 1412 outputs 2 of bit 0 in a row, two of bit 1 in a row, and bit 0 to the remaining bit positions. The offset value input to the bit position decoder 1418 is 12(=a(8n+8)−a(8n+1)), and the bit output number of times is 1(=g(8n+8)), so the bit position decoder 1418 outputs 12 of bit 0 in a row, and 1 of bit 1.

The masks 1421~1428 read out, from a storage device (RAM, register, etc.) 1450 in which input data has been stored, (8n+1)~(8n+8)th bit values d(8n+1), ..., d(8n+8), respectively, and takes the masks with the outputs from the bit position decoders 1411~1418 and outputs to the OR computation unit 1430. That is, each of masks 1421~1428 outputs the subject bits of the input data read out from the storage device 1450 to the position to which a bit 1 has been output from the bit position decoder, and outputs a bit 0 to every other position.

In doing so, the masks 1421~1428 each output the bit values d(8n+1), ..., d(8n+8) of the input data to the bit addresses a(8n+1)~{a(8n+1)+g(8n+1)−1}, ..., a(8n+8)~{a(8n+8)+g(8n+8)−1} respectively, and outputs a bit 0 to each of other bit addresses.

The OR computation unit 1430 outputs the output bit from the masks 1421~1428 after performing OR computation for each bit position. Therefore, the bit values d(8n+1), ..., d(8n+8) of the (8n+1)~(8n+8)th bits of the input data are respectively output to bit addresses a(8n+1)~{a(8n+1)+g(8n+1)−1}, ..., a(8n+8)~{a(8n+8)+g(8n+8)−1}.

As described above, the rate matching device 1400 outputs a plurality of bits of the input data, in a parallel manner, an output number of times of the bit address generation unit 1200. Consequently, in order to determine puncturing/repetition of a certain processing subject bit, the rate matching device 1400 is able to execute rate matching processing at a faster speed compared to the conventional configuration in which the parameter e must be sequentially computed from the first bit to the processing subject bit.

In addition, in the present embodiment, expanded or contracted data which has undergone rate matching is stored in a RAM 1470, in which data of N bits can be stored in 1 address block as shown in FIG. 15, in sequential order starting from the first part of the block of a RAM address 0. For this reason, the rate matching results output from the OR computation unit 1430 is stored from the bit position (a(8n+1)−1)modN of the block of which the RAM address is $$\left\lfloor \frac{a(8n+1)-1}{N} \right\rfloor.$$

<De-rate Matching Device>

Next, an example of the configuration of the de-rate matching device using the above-mentioned bit address generation unit 1200 will be described. In the case of performing error correction decoding of received data, the receiver calculates the probability of the received data matching the bit column of the candidate, based on the soft value column of the received data, and narrows down the data candidates after decoding. Here, the calculation of the probability that the transmitted data and the bit column are matched is performed based on the energy (transmitted electrical power) assigned to each bit of the transmitted data. For this reason, in order to perform error correction decoding in an appropriate manner, it is necessary to find the energy assigned to each bit of the transmitted data.

The data after rate matching is transmitted at a certain energy for each 1 bit, so, generally, the energy assigned to the symbol corresponding to before rate matching becomes bigger as the number of bits (weight) after rate matching gets larger. Consequently, in the present embodiment, the weighted soft values of the bits of the received data (pre-expanded/contracted data) are output. Thus, the energy corresponding to the bit weight assigned to each bit can be estimated, making it possible to perform, in an appropriate manner, error correction decoding.

Figure 16:
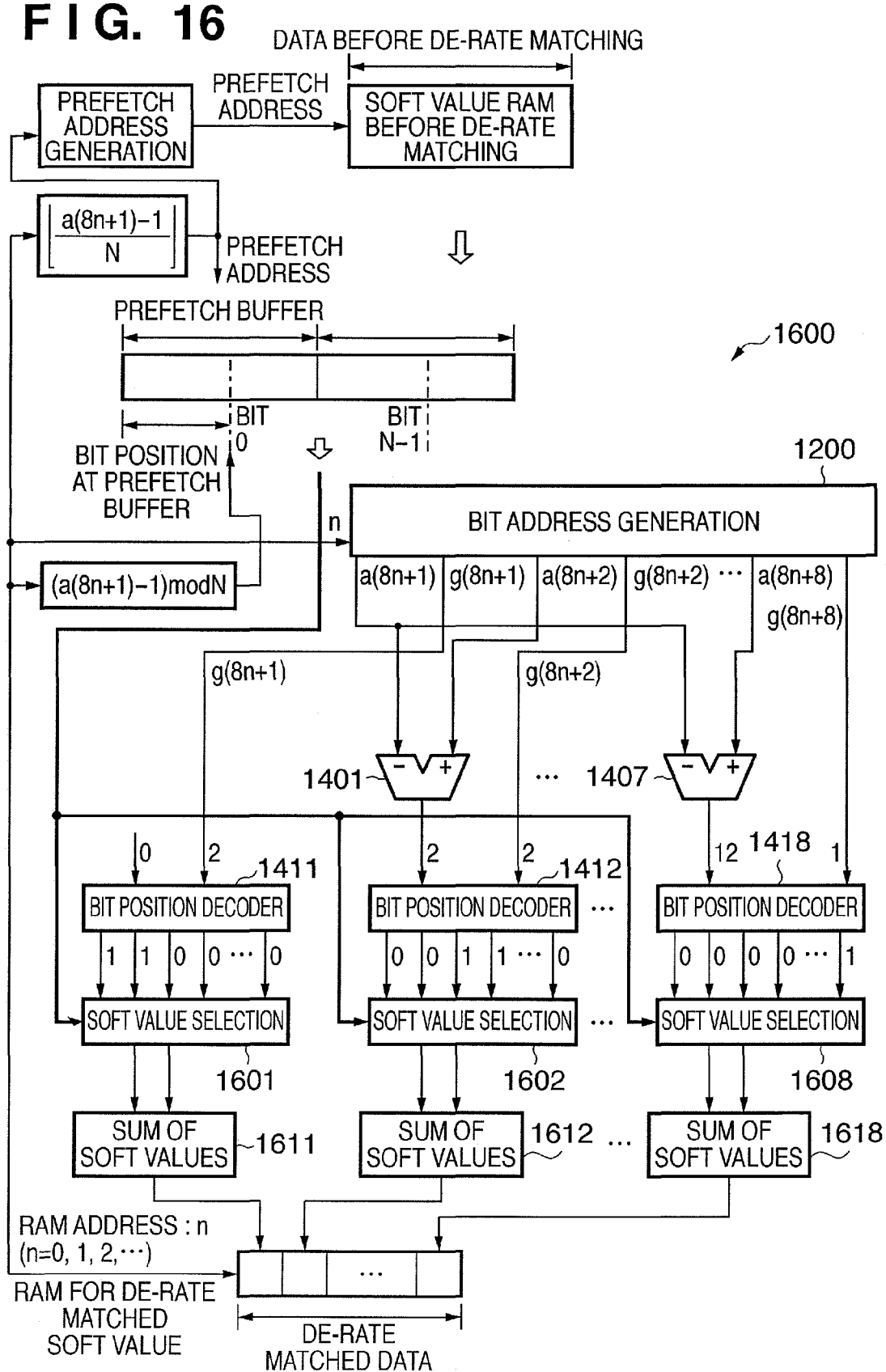
FIG. 16 is a diagram showing an example of a de-rate matching device using a bit address generation unit.

FIG. 16 is a diagram shown an example of a de-rate matching device 1600 using the bit address generation unit 1200. The de-rate matching device 1600 performs de-rate matching in a parallel manner of expanded or contracted data which has been expanded or contracted by rate matching processing, 8 bits at a time. As in FIG. 16, the de-rate matching device 1600 has the address generation unit 1200, 7 addition units 1401~1407, 8 bit position decoders 1411~1418, 8 soft value selection units 1601~1608, and 8 addition units 1611~1618. As the address generation unit 1200, the addition units 1401~1407, and the bit position decoders 1411~1418 are the same as explained with reference to FIG. 14, their descriptions will be omitted. Moreover, in the de-rate matching device 1600, the output of the bit position decoders 1411~1418 are input to the soft value selection units 1601~1608, respectively.

The bit address generation unit 1200 inputs n=0, 1, 2, ... from the counter (not diagrammatically shown), and determines the first bit address a(8n+1), ..., a(8n+8) of the corresponding location of the expanded or contracted data, as well as the output number of times g(8n+1), ..., g(8n+8). The de-rate matching device 1400 outputs each bit of the pre-expanded/contracted data using the bit starting from these first bit addresses. In more specific terms, bits of the expanded or contracted data of a number equaling the output number of times g(8n+1), ..., g(8n+8) is read out from bit addresses a(8n+1), ..., a(8n+8), respectively, and then the weighted average value of bits of expanded or contracted data of a number equaling the number of times is output respectively as pre-expanded/contracted data.

The data (pre-expanded/contracted data) before de-rate matching is pre-fetched beforehand in the RAM 1470 described with reference to FIG. 15 and in which data of N bits for one address block can be stored. The data before de-rate matching is also stored in order from the start of the block of the RAM address 0.

When n=0, 1, 2, ... is input from a counter (not diagrammatically shown), data before rate matching is read out in order from the bit position (a(8n+1)−1)modN of a block which has a RAM address of $$\left\lfloor \frac{a(8n+1)-1}{N} \right\rfloor,$$

and is input to the soft value selection units 1601~1608, respectively. At the same time, the address generation unit 1200 outputs the output number of times g(8n+1), ..., g(8n+8) and the first bit address a(8n+1), ..., a(8n+8) of the (8n+1), ..., (8n+8)th bit of the pre-expanded/contracted data, and, based on these values, the bit 1 of g(8n+1), ..., g(8n+8) from the positions offset based on a(8n+1), ..., a(8n+8) by the bit position decoders 1411~1418 respectively, is output. Then, each of the soft value selection units 1601~1608 outputs to the addition units 1611~1618, respectively, the soft values corresponding to the positions to which bit 1 has been input from the bit position decoder.

The addition units 1611~1618 each calculates the sum (the average value weighted by the bit number before de-rate matching) of the input soft values, and outputs as the de-rate matching value. For example, the bit which became 3 bits through repetition has a soft value after de-rate matching of 1.5 times compared to a bit which became 2 bits after repetition. Also, when a bit which has undergone puncturing goes through de-rate matching, the weight becomes 0, so a value of 0 is output as the soft value.

As described above, the de-rate matching device 1600 restores in a parallel manner from expanded or contracted data the plurality of bits of the pre-expanded/contracted data using the bits starting from the first bit address output by the bit address generation unit 1200 for each bit. For this reason, the de-rate matching device 1600 can execute de-rate matching processing at high speeds compared to a conventional configuration in which it is necessary to compute the parameter e sequentially from the first bit to the processing subject bit.

In addition, the de-rate matching device 1600 reads out the bits of the expanded or contracted data equal to the number of the number of times output from the first bit address output by the bit address generation unit 1200, and outputs, as a weighted soft value of the bits of the pre-expanded/contracted data, the sum of the soft value of the bit of the expanded or contracted data for each of the number of times. Consequently, it is possible to estimate the energy assigned to each bit based on the weighted soft value output from the de-rate matching device 1600, and to decode in an appropriate manner the received data which has been through error correction encoding.

The present invention may provide a technology for executing rate matching/de-rate matching processing at a still faster speed.

As described above, embodiments of the present invention have been described in detail. However, aside from a rate matching device, de-rate matching device, etc., it is possible for the embodiment to involve a method in which a computer executes the above processing or as a program or a storage medium in which the program is stored.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A rate matching device which determines the number of times to output each bit included in input data, and which expands or contracts the data length of the input data, comprising:

a plurality of determination means for determining, for each bit number (m) of the input data, the number of times g(m) to output the corresponding bit of the input data, based on basic parameters for expanding or contracting the input data and on the value of m;

assigning means for assigning a bit number of the input data, to each of the plurality of determination means in sequence; and output means for outputting the bits of the input data corresponding to the bit numbers which the assigning means assigned to each of the plurality of determination means, the number of times of output being determined by the determination means for each bit, wherein the basic parameters are an initial value $e_{ini}(\geqq 1)$, a decremental value $e_{minus}$, and an incremental value $e_{plus}(\geqq e_{ini})$, and wherein each of the plurality of determination means comprises:

calculation means for calculating, in order to make positive a value that is given by subtracting the decremental value $e_{minus}$ m times from the initial value $e_{ini}$, a minimum value q(m) of a number of the incremental value $e_{plus}$ to be added to said value; and number of times determination means for determining the number of times g(m) to output the m-th bit of the input data based on q(m)−q(m−1), wherein the determination means is arranged to determine the number of times g(m) by g(m)=q(m)−q(m−1)+1 in the case of repeating bits of the input data, or arranged to determine the number of times g(m) by g(m)=1−(q(m)−q(m−1)) in the case of puncturing bits of the input data, wherein the calculation means calculates the q(m) by $$q(m) = \left\lceil \frac{m \cdot e_{minus} - e_{ini} + 1}{e_{plus}} \right\rceil.$$

2. A rate matching device which determines the number of times to output each bit included in input data, and which expands or contracts the data length of the input data, comprising:

a plurality of determination means for determining, for each bit number (m) of the input data, the number of times g(m) to output the corresponding bit of the input data, based on basic parameters for expanding or contracting the input data and on the value of m;

assigning means for assigning a bit number of the input data, to each of the plurality of determination means in sequence; and output means for outputting the bits of the input data corresponding to the bit numbers which the assigning means assigned to each of the plurality of determination means, the number of times of output being determined by the determination means for each bit, wherein the basic parameters are an initial value $e_{ini}(\geqq 1)$, a decremental value $e_{minus}$, and an incremental value $e_{plus(\geqq e_{ini})}$, and wherein each of the plurality of determination means comprises:

calculation means for calculating, in order to make positive a value that is given by subtracting the decremental value $e_{minus}$ m times from the initial value $e_{ini}$, a minimum value q(m) of a number of the incremental value $e_{plus}$ to be added to said value; and number of times determination means for determining the number of times g(m) to output the m-th bit of the input data based on q(m)−q(m−1), wherein the determination means is arranged to determine the number of times g(m) by g(m)=q(m)−q(m−1)+1 in the case of repeating bits of the input data, or arranged to determine the number of times g(m) by g(m)=1 −(q(m)−q(m−1)) in the case of puncturing bits of the input data, wherein each of the plurality of determination means further comprises a bit position determination means for determining the first bit position a(m) of positions to be occupied, in expanded or contracted data, by an output result of the output means for an m-th bit of the input data to be processed by the determination means, based on the basic parameters and on the value of m; and wherein the output means comprises a storage means which stores into memory an m-th bit included in the input data, from an address of the memory corresponding to the first bit position a(m) determined in the bit position determination means to an address of the memory corresponding to a bit position a(m)+g(m)−1.

3. The rate matching device according to claim 2, wherein the bit position determination means determines the first bit position a(m) by a(m) =m+q (m−1) in the case of repeating bits in the input data, and the bit position determination means determines the first bit position a(m) by a(m)=m−q(m−1) in the case of puncturing bits of the input data.

4. A de-rate matching device which decodes, to pre-expanded/contracted data, expanded or contracted data in which a data length has been expanded or contracted, comprising:

a plurality of determination means for determining, for each bit number (m) of the pre-expanded/contracted data, a corresponding first bit position a(m), in the expanded or contracted data, of an m-th bit of the pre-expanded/contracted data, based on basic parameters used when the pre-expanded/contracted data is expanded or contracted, and on the value of m;

assigning means for assigning a bit number of the pre-expanded/contracted data to each of the plurality of determination means, in sequence; and output means for outputting the bits of the pre-expanded/contracted data corresponding to the first bit positions, which the determination means determined for each bit of the pre-expanded/contracted data corresponding to the bit number which the assigning means assigned to each of the plurality of determination means, wherein the basic parameters are an initial value $e_{ini}(\geqq 1)$, a decremental value $e_{minus}$, and an incremental value $e_{plus}(\geqq e_{ini})$, and wherein each of the plurality of determination means comprises:

calculation means for calculating, in order to make positive a value that is given by subtracting the decremental value $e_{minus}$ m times from the initial value $e_{ini}$, a minimum value q(m) of a number of the incremental value $e_{plus}$ to be added said the value; and position determination means for determining the first bit position a(m) based on q(m−1) and on the value of m, wherein the position determination means is arranged to determine the first bit position a(m) by the equation a(m)=m+q(m−1) in the case of decoding expanded data, or arranged to determine the first bit position a(m) by the equation a(m)=m−q(m−1) in the case of decoding contracted data.

5. The de-rate matching device according to claim 4, wherein the calculation means calculates the value of q(m) according to the equation $$q(m) = \left\lceil \frac{m \cdot e_{minus} - e_{ini} + 1}{e_{plus}} \right\rceil.$$

6. The de-rate matching device according to claim 4, wherein each of the plurality of determination means comprises number of times determination means for determining the number of times g(m) that an m-th bit of the pre-expanded/contracted data has been output when the expanded or contracted data has been generated from the pre-expanded/contracted data, based on the basic parameters and on the value of m; and wherein the output means reads out, for the m-th bit of the pre-expanded/contracted data, bits of the expanded or contracted data from the first bit position a(m) to the bit position a(m)+g(m)−1, and outputs a sum of the soft value of the bits of expanded or contracted data read out, as a soft value of the m-th bit of the pre-expanded/contracted data.

7. The de-rate matching device according to claim 6, wherein the number of times determination means determines the number of times g(m) based on q(m) −q(m−1).

8. The de-rate matching device according to claim 7, wherein the number of times determination means determines the number of times g(m) by g(m) =q(m)−q(m−1)+1 in the case where expanded data is decoded, and the number of times determination means determines the number of times g(m) by g(m) =1−(q(m)−q(m−1)) in the case where contracted data is decoded.

9. A communication device comprising at least one of a rate matching device and a de-rate matching device,
wherein:
the rate matching device determines the number of times to output each bit included in input data, and expands or contracts the data length of the input data;
the de-rate matching device decodes, to pre-expanded/contracted data, expanded or contracted data in which a data length has been expanded or contracted;
the rate matching device comprises:
a plurality of determination means for determining, for each bit number (m) of the input data, the number of times g(m) to output the corresponding bit of the input data, based on basic parameters for expanding or contracting the input data and on the value of m;
assigning means for assigning a bit number of the input data, to each of the plurality of determination means in sequence; and
output means for outputting the bits of the input data corresponding to the bit numbers which the assigning means assigned to each of the plurality of determination means, the number of times of output being determined by the determination means for each bit,
wherein the basic parameters are an initial value $e_{ini}$ ($\geqq 1$), a decremental value $e_{minus}$, and an incremental value $e_{plus}$ ($\geqq e_{ini}$), and
wherein each of the plurality of determination means comprises:
calculation means for calculating, in order to make positive a value that is given by subtracting the decremental value $e_{minus}$ m times from the initial value $e_{ini}$, a minimum value q(m) of a number of the incremental value $e_{plus}$ to be added to said value; and
number of times determination means for determining the number of times g(m) to output the m-th bit of the input data based on q(m)−q(m−1),
wherein the determination means is arranged to determine the number of times g(m) by g(m)=q(m)−q(m−1)+1 in the case of repeating bits of the input data, or arranged to determine the number of times g(m) by g(m)=1−(q(m)−q(m−1)) in the case of puncturing bits of the input data; and
the de-rate matching device comprises:
a plurality of determination means for determining, for each bit number (m) of the pre-expanded/contracted data, a corresponding first bit position a(m), in the expanded or contracted data, of an m-th bit of the pre-expanded/contracted data, based on basic parameters used when the pre-expanded/contracted data is expanded or contracted, and on the value of m;
assigning means for assigning a bit number of the pre-expanded/contracted data to each of the plurality of determination means, in sequence; and
output means for outputting the bits of the pre-expanded/contracted data corresponding to the first bit positions, which the determination means determined for each bit of the pre-expanded/contracted data corresponding to the bit number which the assigning means assigned to each of the plurality of determination means,
wherein the basic parameters are an initial value $e_{ini}$ ($\geqq 1$), a decremental value $e_{minus}$, and an incremental value $e_{plus}$ ($\geqq e_{ini}$), and
wherein each of the plurality of determination means comprises:
calculation means for calculating, in order to make positive a value that is given by subtracting the decremental value $e_{minus}$ m times from the initial value $e_{ini}$, a minimum value q(m) of a number of the incremental value $e_{plus}$ to be added said the value; and
position determination means for determining the first bit position a(m) based on q(m−1) and on the value of m,
wherein the position determination means is arranged to determine the first bit position a(m) by the equation a(m)=m+q(m−1) in the case of decoding expanded data, or arranged to determine the first bit position a(m) by the equation a(m)=m−q(m−1) in the case of decoding contracted data.

10. A de-rate matching method which decodes expanded or contracted data, whose data length has been expanded or contracted, to pre-expanded/contracted data, comprising the steps of:
determining in parallel, for each bit of the pre-expanded/contracted data, a corresponding first bit position a(m), in the expanded or contracted data, of an m-th bit of the pre-expanded/contracted data, based on basic parameters used when the pre-expanded/contracted data is expanded or contracted, and on the value of the m; and
outputting bits of the pre-expanded/contracted data corresponding to each first bit position, determined in the determining step, for each bit of the pre-expanded/contracted data,
wherein the basic parameters are an initial value $e_{ini}$ ($\geqq 1$), a decremental value $e_{minus}$, and an incremental value $e_{plus}$ ($\geqq e_{ini}$), and
wherein each of the parallel determinations comprises:
calculating, in order to make positive a value that is given by subtracting the decremental value $e_{minus}$ m times from the initial value $e_{ini}$, a minimum value q(m) of a number of the incremental value $e_{plus}$ to be added said the value; and
determining the first bit position a(m) based on q(m−1) and on the value of m, the first bit position a(m) by the equation a(m)=m+q(m−1) in the case of decoding expanded data, or the first bit position a(m) by the equation a(m)=m−q(m−1) in the case of decoding contracted data.

11. A non-transitory computer-readable storage medium storing a program for making a computer function in accordance with at least one of a rate matching method and a de-rate matching method,
wherein:
the rate matching method determines the number of times to output each bit included in input data, and expands or contracts the data length of the input data;

the de-rate matching method decodes expanded or contracted data, whose data length has been expanded or contracted, to pre-expanded/contracted data;

the rate matching method comprises:

determining in parallel the number of times g(m) to output the m-th bit of the input data for each bit of the input data, based on basic parameters for expanding or contracting the input data and on the value of the m; and outputting each bit included in the input data the number of times which has been determined for said bit, wherein each of the parallel determinations comprises:

calculating, in order to make positive a value that is given by subtracting the decremental value $e_{minus}$ m times from the initial value $e_{ini}(\geq 1)$, a decremental value $e_{minus}$, and an incremental value $e_{plus}$ ($\geq e_{ini}$), and wherein each of the parallel determinations comprises:

calculating, in order to make positive a value that is given by subtracting the decremental value $e_{minus}$ m times from the initial value $e_{ini}$, a minimum value q(m) of a number of the incremental value $e_{plus}$ to be added to said value; and determining the number of times g(m) to output the m-th bit of the input data based on q(m)−q(m−1), the number of times g(m) by g(m)=q(m)−q(m−1)+1 in the case of repeating bits of the input data, or the number of times g(m) by g(m)=1−(q(m)−q(m−1)) in the case of puncturing bits of the input data; and the de-rate matching method comprises:

determining in parallel, for each bit of the pre-expanded/contracted data, a corresponding first bit position a(m), in the expanded or contracted data, of an m-th bit of the pre-expanded/contracted data, based on basic parameters used when the pre-expanded/contracted data is expanded or contracted, and on the value of the m; and outputting bits of the pre-expanded/contracted data corresponding to each first bit position, determined in the determining step, for each bit of the pre-expanded/contracted data wherein the basic parameters are an initial value $e_{ini}$ ($\geq 1$), a decremental value $e_{minus}$, and an incremental value $e_{plus}$ ($\geq e_{ini}$), and wherein each of the parallel determinations comprises:

calculating, in order to make positive a value that is given by subtracting the decremental value $e_{minus}$ m times from the initial value $e_{ini}$, a minimum value q(m) of a number of the incremental value $e_{plus}$ to be added said the value; and determining the first bit position a(m) based on q(m−1) and on the value of m, the first bit position a(m) by the equation a(m)=m+q(m−1) in the case of decoding expanded data, or the first bit position a(m) by the equation a(m)=m−q(m−1) in the case of decoding contracted data.

* * * * *

UNITED STATES PATENT AND TRADEMARK OFFICE
CERTIFICATE OF CORRECTION

PATENT NO. : 8,396,078 B2
APPLICATION NO. : 12/664033
DATED : March 12, 2013
INVENTOR(S) : Asanaka It is certified that error appears in the above-identified patent and that said Letters Patent is hereby corrected as shown below:

In the Specification

In Column 1, Line 14, delete "entirety" and insert -- entirety. --, therefor.

In Column 1, Line 53, delete "$e_{minus}$ and" and insert -- $e_{minus}$, and --, therefor.

In Column 5, Line 28, delete "output" and insert -- output 1 --, therefor.

In Column 8, Line 15, delete "xi, m" and insert -- $x_{i,m}$ --, therefor.

In Column 8, Line 36, delete "xi,m" and insert -- $x_{i,m}$ --, therefor.

In Column 9, Line 41, delete "time," and insert -- time, however --, therefor.

In Column 11, Line 25, delete "masters 1421~1428," and insert -- masks 1421~1428, --, therefor.

In Column 11, Line 63, delete "IN" and insert -- In --, therefor.

In Column 13, Line 33, delete "de-rate matching device 1400" and insert -- de-rate matching device 1600 --, therefor.

In the Claims

In Column 15, Line 45, in Claim 2, delete "$e_{plus}(\gtrsim e_{ini})$," and insert -- $e_{plus}(\geqq e_{ini})$, --, therefor.

In Column 20, Line 12, in Claim 11, delete "data" and insert -- data, --, therefor.

Signed and Sealed this
Thirty-first Day of December, 2013

Margaret A. Focarino
*Commissioner for Patents of the United States Patent and Trademark Office*